Dec. 24, 1929.  E. W. WEBB  1,740,912
SIDE FRAME AND SPRING STRUCTURE
Filed Aug. 5, 1927    4 Sheets-Sheet 1
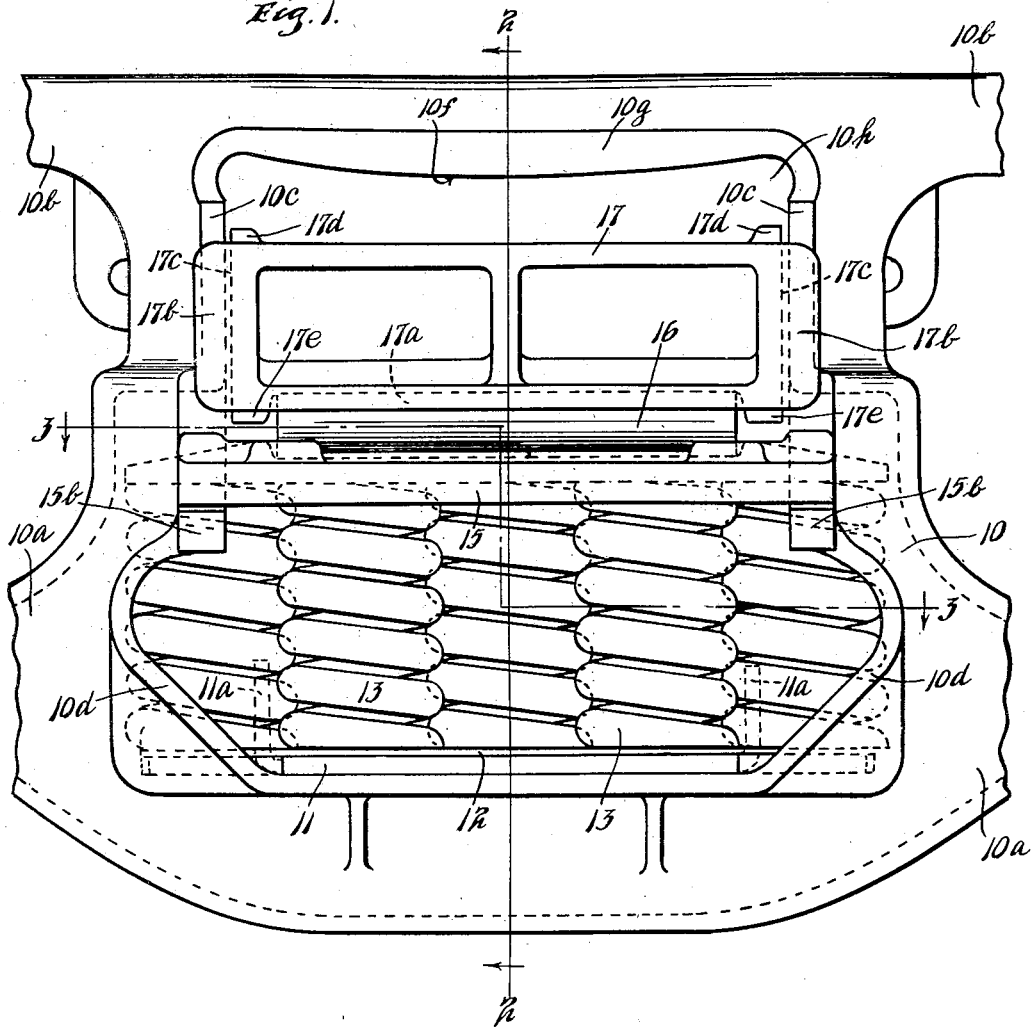
INVENTOR.
EDWIN W. WEBB.
BY HIS ATTORNEYS.

Dec. 24, 1929.  E. W. WEBB  1,740,912
SIDE FRAME AND SPRING STRUCTURE
Filed Aug. 5, 1927  4 Sheets-Sheet 2
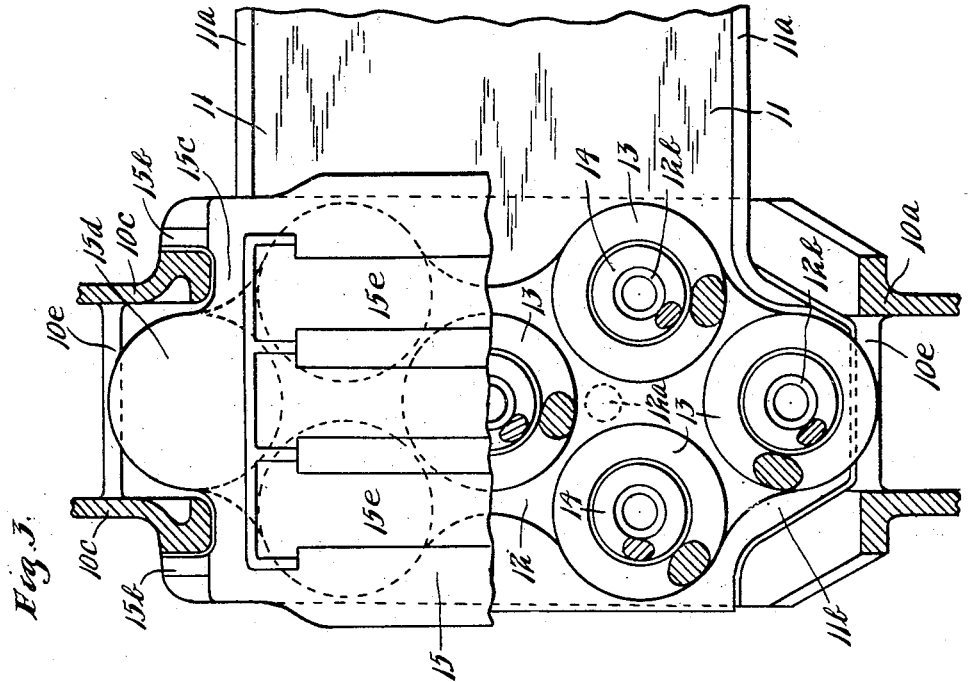
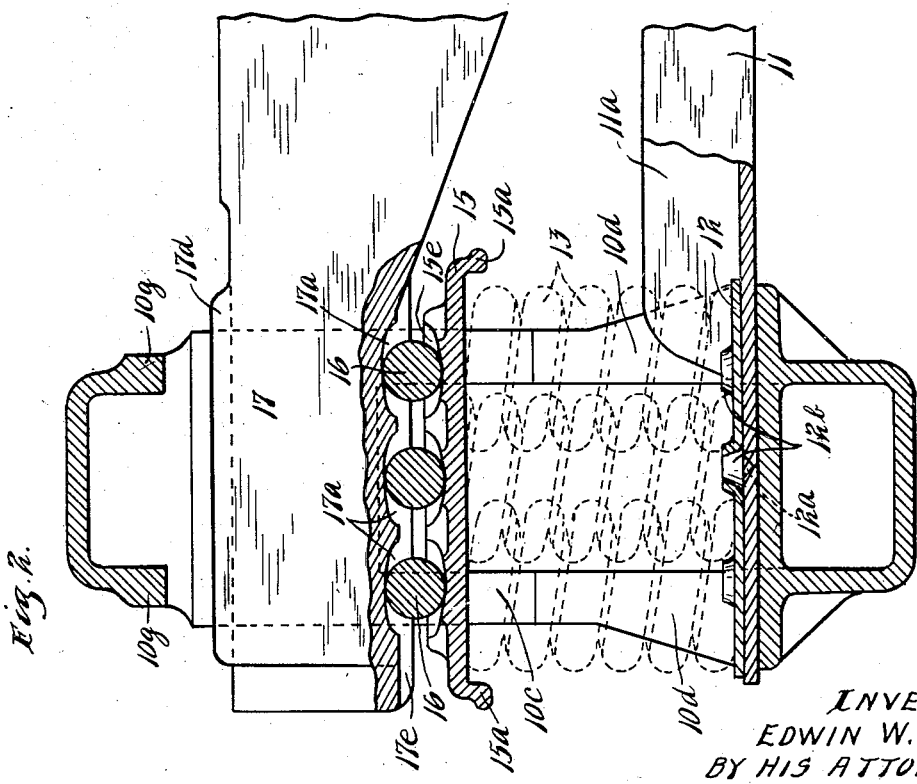
INVENTOR.
EDWIN W. WEBB.
BY HIS ATTORNEYS.

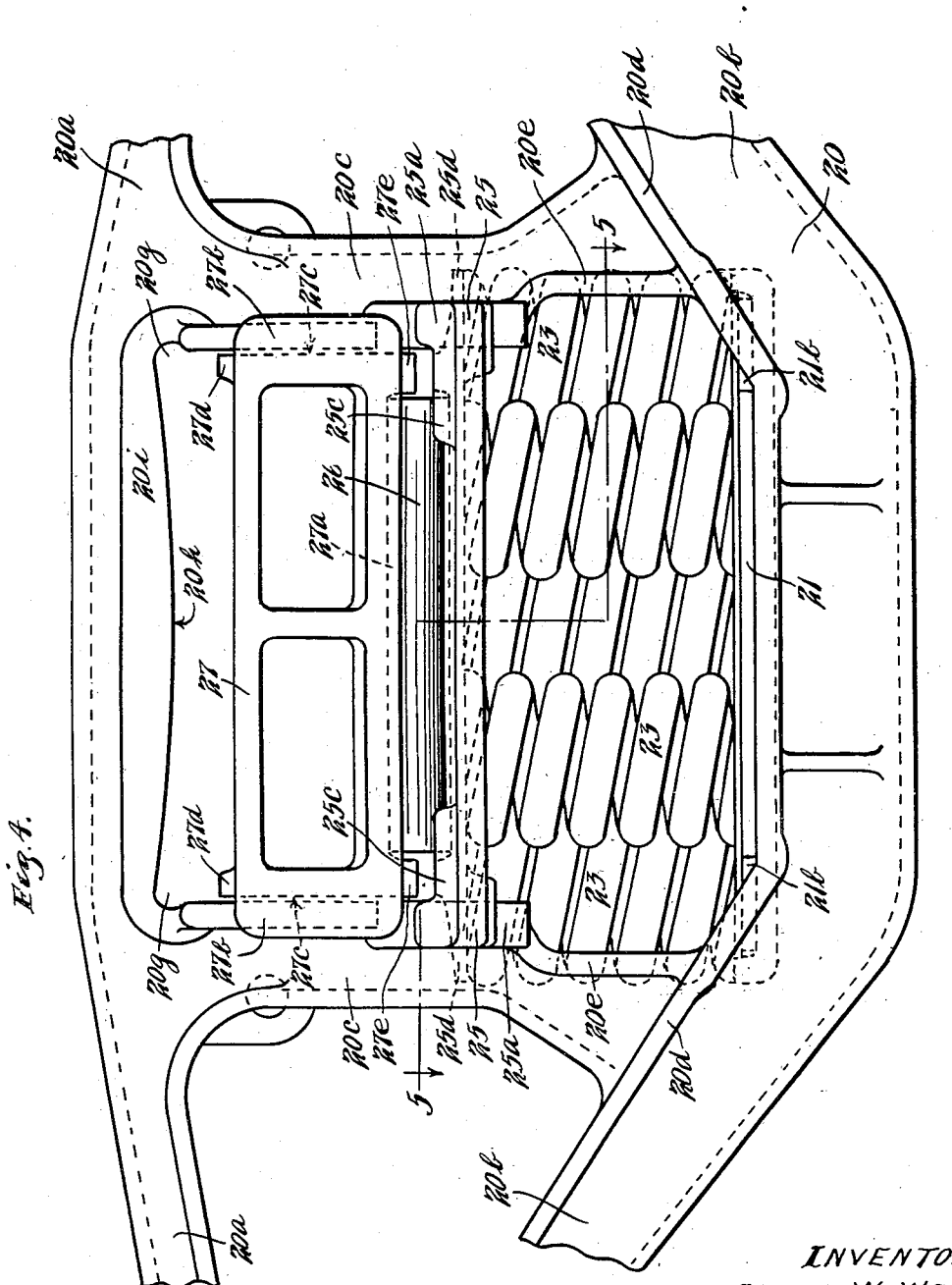

Dec. 24, 1929.  E. W. WEBB  1,740,912

SIDE FRAME AND SPRING STRUCTURE

Filed Aug. 5, 1927  4 Sheets-Sheet 4

INVENTOR.
EDWIN W. WEBB.
BY HIS ATTORNEYS.

Patented Dec. 24, 1929

1,740,912

UNITED STATES PATENT OFFICE

EDWIN W. WEBB, OF CHICAGO, ILLINOIS, ASSIGNOR TO STANDARD CAR TRUCK COMPANY, OF CHICAGO, ILLINOIS, A CORPORATION OF NEW JERSEY

SIDE FRAME AND SPRING STRUCTURE

Application filed August 5, 1927. Serial No. 210,817.

This invention relates to a car truck structure, and while the truck is applicable to various kinds of railway cars, it, particularly, is designed for a freight car truck, and one using a cast steel side frame.

In the use of the cast steel side frames now being used for such trucks it is desirable to have the heavier load carrying portions of the side frame in the line of stress. Such side frames have spaced bolster columns with a spring opening between and below the column faces and a problem is presented to secure the proper strength in the side frame and at the same time accommodate the necessary bolster and car body supporting springs in compact relation. Some side frames which are now being used have provided gussets extending into the spring opening which has caused the rearrangement of the springs and special lateral motion devices.

It is an object of this invention to provide a car truck comprising a side frame having its load carrying sections disposed substantially in the line of stress of the tension member and so disposed that a compact arrangement of springs is possible in the spring opening.

It is another object of the invention to provide a car truck having a side frame with reinforcing ribs or sections at the sides of the tension member disposed at the outer sides of the frame so that the spring opening is unobstructed, said frame preferably having the lower column portions of channel shape with the channels directed inwardly whereby the end springs can be housed in the recesses of channels of the columns.

It is another object of the invention to provide a car truck comprising a side frame, the top member of which, between the bolster columns, is deeper in the center than at the ends whereby more room is afforded for the bolster guides and a greater bearing surface of the bolster on the columns can be had without decreasing the strength thereof.

It is still further an object of the invention to provide a truck structure having a side frame with spaced bolster columns of channel shape in cross section and having end springs disposed in said channel, together with a roller bearing plate extending over said springs and having semi-circular lugs projecting into said channels to be disposed over the springs therein, said bearing plate having column guides at the sides of the column.

It is still another object of the invention to provide a truck structure comprising a side frame having spaced bolster columns of channel shape in cross section, a spring plank extending transversely between said columns and resting on the bottom member of the side frame, said spring plank having lateral extensions projecting into the channels of said columns adapted to support the end springs.

It is also an object of the invention to provide a car truck as set forth in the preceding paragraph, in which said end springs project over the edge of the spring plank and are supported partially directly on a step in the side frame.

These and other objects and advantages of the invention will be fully set forth in the following description made in connection with the accompanying drawings in which like characters refer to the same parts throughout the different views, and in which, Fig. 1 is a view in side elevation of the central portion of a truck;

Fig. 2 is a vertical section taken on the line 2—2 of Fig. 1;

Fig. 3 is a horizontal section taken on the line 3—3 of Fig. 1;

Fig. 4 is a view similar to Fig. 1 showing a modified form of the side frame;

Figure 5:
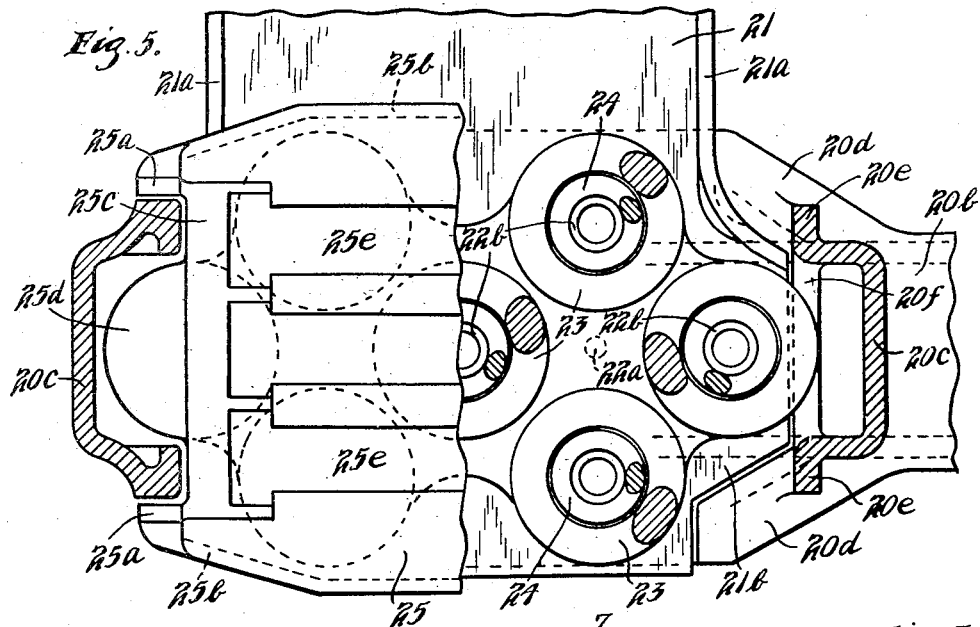
Fig. 5 is a horizontal section taken on the line 5—5 of Fig. 4, as indicated by the arrows.

Referring to the drawings, particularly to Figs. 1, 2 and 3, a truck structure is shown comprising a side frame 10 having a tension member 10$^a$, a top or compression member 10$^b$ and the spaced bolster columns 10$^c$. The side frame illustrated is of the cast type.

Figure 6:
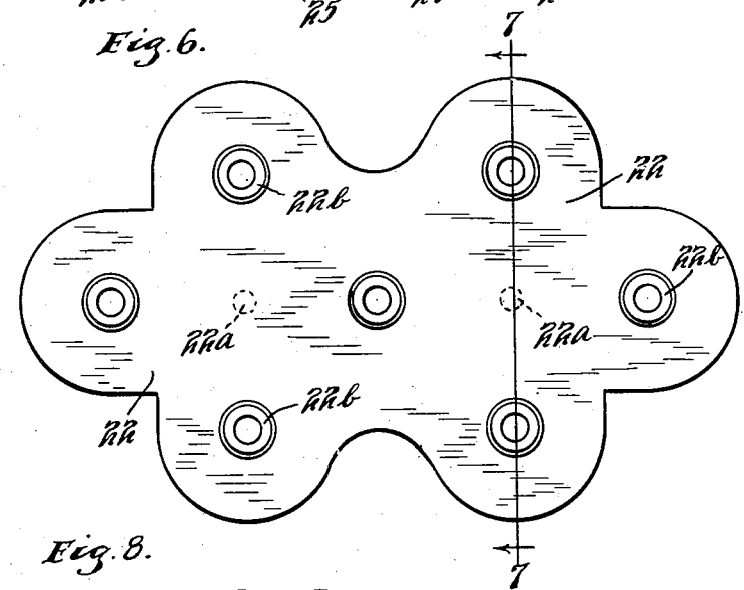
Fig. 6 is a plan view of the spring bearing plate.
Figure 7:
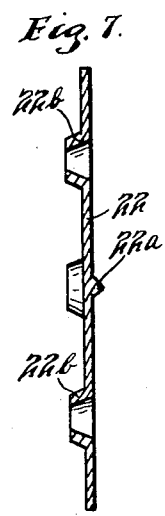
Fig. 7 is a vertical section taken on the line 7—7 of Fig. 6, as indicated by the arrows.
Figure 8:
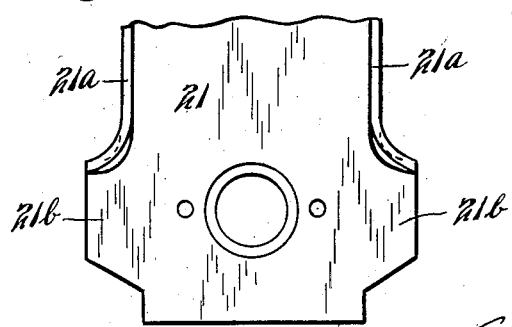
Fig. 8 is a plan view of one end of the spring plank.

The bolster column portions, 10ᶜ are of channel shape in cross section, as shown in Fig. 3, and a spring-receiving opening is formed between the top surface of the bottom or tension member 10ᵃ and the lower portion of the bolster columns. It is desirable to have the strong part of the side frame disposed substantially in the line of stress of the tension member and for this purpose, ribs or gussets 10ᵈ are provided projecting outwardly at each side of the side frames, these ribs having their greatest width, as clearly shown in Fig. 2, at the upper surface of the bottom member 10ᵃ at the bottom of the spring opening. With the construction shown, it will be seen that a flat surface is secured at the bottom of the spring-receiving opening in which is disposed the end of the spring plank 11 which extends between the side frames of the truck. This member 11 is of flat plate form having the flanges 11ᵃ extending upwardly at the sides thereof, said member having laterally extending portions 11ᵇ shown as substantially trapezoidal in form, which extend into the channels at each end of the spring opening, said channels being formed in the bolster sections. Flanges 11ᵃ, as shown in Fig. 3, are tapered and discontinued at one side of the portions 11ᵇ. A spring bearing plate 12 of thin sheet steel overlies the spring plank 11 having downwardly extending locating points 12ᵃ adapted to be received in suitable recesses in the top of the spring plank. The plate 12 has frusto-conical projections 12ᵇ struck up therefrom which are disposed centrally of the springs 13 which rest on said plate. These parts are similar to those shown in Figs. 6 and 7, to be later described. It will be seen that, in the embodiment of the invention illustrated in Figs. 1, 2 and 3, seven springs are used, the end springs of which are disposed largely within the channels of the bolster columns. These end springs rest almost wholly on the projecting flanges 11ᵇ of the spring plank 11 but extend partially over a step 10ᵉ formed in the side frame. The springs 13 are thus disposed at one level and these springs may have smaller springs 14 disposed therewithin, if desired, as shown in Fig. 3. The springs 13 and 14 are surmounted by the roller bearing plate 15, which plate has a downwardly extending flange 15ᵃ at its sides extending along the outer sides of the two outer springs at each side, respectively. The plate 15 extends between the bolster columns and column guides 15ᵇ disposed at each side of each column, as clearly shown in Figs. 1 and 3. The plate 15 has a heavy reinforced section or rib 15ᶜ extending between the column guides 15ᵇ at the sides of the same column and has a semi-circular projecting lug 15ᵈ projecting into the channel or bay of the column and over the end springs 13 and 14. The plate 15 also has parallel concave grooves of special contour 15ᵉ on its upper surface extending between the sections or ribs 15ᶜ in which are disposed the roller bearings 16 which support the truck bolster 17 which also has parallel concave grooves of special contour 17ᵃ in its undersurface in which the rollers 16 are disposed. The bolster 17 has column guides or stop portions 17ᵇ at each side adapted to engage the side faces of the bolster columns and also has faces or surfaces 17ᶜ for engaging the column faces. The surfaces 17ᶜ are extended on lugs projecting above the top of the bolster as shown at 17ᵈ and also extend downwardly, as shown, at 17ᵉ. The projections 17ᵉ and 17ᵈ give additional bearing surface and wearing surface on the bolster. To accommodate the projection 17ᵈ in the assembling of the truck, the recesses 10ʰ are provided in the side frame adjacent the upper ends of the bolster columns and to strengthen the side frame the same is curved downwardly at the bottom of the top or compression member 10ᵇ, as shown at 10ᶠ, a rib 10ᵍ extending along each side of the top member 10ᵇ across the opening between the bolster columns and around the recesses 10ᵈ to the bolster column faces.

In operation, the weight of the car body will be carried on the bolster 17 and will be transmitted through the rollers 16 to the plate 15 and will be equally distributed over all of the springs 13 and 14 by the plate 15. Said springs are compactly and nicely housed in the spring opening and are all disposed at one height. The standard bearing plate can thus be used and no offsets or recesses are necessary therein. The bolster 17 is capable of endwise movement transversely of the side frame on the rollers 16. A very simple, compact and convenient arrangement of the springs is thus obtained and, at the same time, the reinforcing parts of the side frame are disposed substantially in the line of stress.

In the form shown in Figs. 4 to 8, a somewhat modified form of truck is shown comprising a side frame 20 having the top or compression member 20ᵃ, the bottom or tension member 20ᵇ and the spaced bolster columns 20ᶜ. The tension member 20ᵇ is a box section and has a heavy reinforcing rib or gusset 20ᵈ extending upwardly in an inclined direction from the bottom of the spring seat opening, this rib extending horizontally along the bottom of the spring receiving opening. The columns 20ᶜ are of channel section with the channels directed inwardly, as clearly shown in Fig. 5, and have the ribs 20ᵉ below the guide faces thereof. A spring plank 21 is provided which will extend between the side frames of the truck, said plank having upwardly extending flanges 21ᵃ at each side and the same having lateral projections 21ᵇ shown as substantially trapezoidal in form which project into the ends of the spring-receiving opening. The flanges 21ª are discontinued at the inner side of the projection 21ᵇ, as shown in Fig. 5. A spring bearing plate 22 similar to the plate 12, already described, overlies the plank 21 having locating points 22ª thereon adapted to be received in similar recesses in said plank and having upwardly projecting frusto-conical portions 22ᵇ adapted to center and extend within the springs 23 and 24 which rest on the plate 22. As shown in Fig. 5, seven springs 23 are used which may have disposed therein, if desired, the smaller springs 24. The use of the springs 24 will depend upon the load the truck is designed to carry. It will be seen that the end springs 23 project from the ends of the projections 21ᵇ of the spring plank 21 and are supported partially upon steps 20ᶠ of the side frame. The springs 23 and 24 are surmounted and engaged by a roller bearing plate or spring cap 25 extending between the bolster columns and having column guides 25ª projecting beyond the face of the columns and disposed at each side thereof. The plate 25 has downwardly extending flanges 25ᵇ at each side which extend from the column guide 25ª at one side to the column guide 25ª at the opposite bolster column and said plate has a heavy reinforcing section or rib 25ᶜ extending between the column guides 25ª of the same column and extending closely adjacent the column face. Said plates also have projecting semi-circular end lugs 25ᵈ extending into the channels of the column 20ᶜ and over the end springs 23. Said plates have spaced parallel roller grooves 25ᵉ extending between the ribs 25ᶜ in which are disposed the bolster supporting rollers 26 on which the bolster 27 rests. Said bolster, like the bolster 17 already described, has spaced parallel roller seats or grooves 27ª in its bottom surface in which the rollers 26 are disposed. The bolster 27 has the column guides or stop portions 27ᵇ at each side of the bolster column for engaging the side faces thereof and has bearing faces 27ᶜ engaging the faces of the bolster columns, said surfaces 27ᶜ being extended at the top on the lugs 27ᵈ and at the bottom on the lugs 27ᵉ. To accommodate the lugs 27ᵈ in assembling the truck, recesses 20ᵍ are formed at the upper ends of the bolster column faces and to strengthen the side frame, the compression member 20ª is bowed downwardly at its central portion, as shown at 20ʰ, and a rib 20ⁱ extends along each side of the side frame above the opening between the bolster columns and around the recesses 20ᵍ.

The operation of the device shown in Figs. 4 to 8 is substantially the same as that already described for the truck shown in Figs. 1 to 3. The bolster 27 has provision for the usual endwise movement laterally of the side frame and the load is carried on the springs 24 and 23 and equally distributed thereover by the plate 25. An unobstructed spring opening is secured in the side frame whereby the springs disposed centrally of the bolster columns can project into the channels of the columns and all be disposed at one level. The standard roller plate lateral motion device can thus be used.

From the above description it is seen that applicant has provided a very simple, compact and efficient structure of car truck comprising a cast steel frame having its reinforced portions disposed in the true line of stress, particularly in the tension member and in which an unobstructed spring opening is obtained whereby a compact arrangement of springs can be secured and no special lateral motion devices are necessary. The device has been amply demonstrated in practice and found to be very successful and efficient and the same is being commercially manufactured.

It will, of course, be understood, that changes may be made in the form, details, arrangement and proportions of the parts without departing from the scope of applicant's invention, which, generally stated, consists in a device capable of carrying out the objects above set forth, in the novel parts and combinations of parts disclosed and defined in the appended claims.

What is claimed is:

1. A car truck having in combination, a side frame comprising spaced bolster columns, a spring-receiving opening between said columns, said columns being of channel shape in cross section at their lower portion with the channels directed inwardly, thus forming recesses therein, said frame having a spring plank base at the bottom of the spring-receiving opening disposed at one level and extending into the recesses formed by said columns, a group of four or more springs disposed between said bolster columns and additional end springs placed at the ends of said group and disposed within the recesses formed by said columns.

2. The structure set forth in claim 1, said side frame having gussets extending upwardly in an inclined direction from the base of said columns at each side of said frame and disposed substantially in a true line of stress in the tension member of said side frame.

3. A car truck having in combination, a cast side frame comprising spaced bolster columns, said columns being channel shape in cross section at their lower portions, said frame having laterally projecting gussets at the sides thereof extending horizontally along the bottom of the opening between said columns and upwardly in inclined directions at substantially the base of said columns, said frame having a horizontal bottom in said opening extending into the recesses formed by said channel shaped columns, and a spring plank extending transversely through said side frame having projections at its sides extending into the recesses formed by said columns.

4. The structure set forth in claim 3, springs supported by said spring plank, including a group disposed between said bolster columns, and additional end springs disposed at the ends of said group within the recesses formed by said columns, said latter springs being supported partially on a step in said side frame.

5. A truck structure having in combination, a side frame having spaced bolster columns forming a bolster opening therebetween, a bolster projecting between said columns, having wearing surfaces engaging the faces of said columns, said wearing surfaces being extended above the top of said bolster, said side frame being formed with recesses to accommodate said projections and having its top member increased in thickness at its central portion in proportion to the extension of said wearing surface.

6. A truck structure having in combination, a side frame having spaced bolster columns forming a bolster opening therebetween, a bolster projecting between said columns having wearing surfaces engaging the faces of said columns said bolster having upwardly projecting lugs at its top and at its sides on which said wearing surfaces are continued, said side frame having recesses in its top member to accommodate said lugs, said top member being bowed downwardly at its central portion in the opening between said bolster columns.

7. The structure set forth in claim 6, said side frame having reinforcing ribs at each side of its top member extending across the opening between the columns and about said recesses and to the wearing faces of said bolster column.

8. A car truck having in combination a side frame comprising spaced bolster columns having column guides thereon and portions extending vertically downward from said column guides, said frame being of the cast type and having a tension member with laterally projecting ribs extending across its bottom portion and upwardly in inclined directions at its end portions, said frame thus having a bolster and spring receiving opening disposed between said guide portions and tension member, said vertically extending portions meeting said upwardly inclined portions of said tension member, said frame having a horizontal surface at the bottom of said spring receiving opening adapted to receive a plurality of springs all supported at one level, said spring receiving opening extending toward the ends of said frame beyond said vertically extending portions and beyond said column guides.

9. A car truck having in combination, a side frame comprising spaced bolster columns having column guides thereon adapted to receive the end of a bolster therebetween at their upper portions, a roller supporting plate also disposed between and guided on said column guides, rollers on said plates supporting said end of said bolster, and a plurality of springs supported by said frame and supporting said roller supporting plate.

In testimony whereof I affix my signature.

EDWIN W. WEBB.